(12) United States Patent
Gamage

(10) Patent No.: US 10,402,238 B2
(45) Date of Patent: Sep. 3, 2019

(54) CONTAINER-BASED SOFTWARE APPLIANCE

(71) Applicant: CA, Inc., Islandia, NY (US)

(72) Inventor: Nimal K. Gamage, Fort Collins, CO (US)

(73) Assignee: CA, Inc., Islandia, NY (US)

(*) Notice: Subject to any disclaimer, the term of this patent is extended or adjusted under 35 U.S.C. 154(b) by 99 days.

(21) Appl. No.: 15/481,060

(22) Filed: Apr. 6, 2017

(65) Prior Publication Data
US 2018/0293118 A1    Oct. 11, 2018

(51) Int. Cl.
| G06F 3/00 | (2006.01) |
| G06F 9/44 | (2018.01) |
| G06F 9/46 | (2006.01) |
| G06F 13/00 | (2006.01) |
| G06F 9/54 | (2006.01) |
| H04L 12/741 | (2013.01) |
| H04L 12/751 | (2013.01) |

(52) U.S. Cl.
CPC ............. *G06F 9/546* (2013.01); *H04L 45/02* (2013.01); *H04L 45/74* (2013.01)

(58) Field of Classification Search
CPC ....................................................... G06F 9/546
USPC ........................................................ 719/313
See application file for complete search history.

(56) References Cited

U.S. PATENT DOCUMENTS

| 2013/0250827 A1* | 9/2013 | Patwardhan | H04W 8/24 370/311 |
| 2017/0005947 A1* | 1/2017 | Chu | H04L 45/24 |

* cited by examiner

*Primary Examiner* — Timothy A Mudrick
(74) *Attorney, Agent, or Firm* — Alliance IP, LLC

(57) ABSTRACT

An announcement message is received on a control channel at a system controller hosted on a first software container in a software system from a first tool hosted on a second software container in the software system. Capabilities of the first tool are identified at the system controller and a first channel and a second channel are assigned to the first tool based on the capabilities. The first and second channels are software-based communication channels in the software system, the first channel assigned to the first tool for use in sending messages to other tools in the software system and the second channel assigned to the first tool for use in receiving messages from other tools. A channel assignment message is sent to the first tool on the control channel, where the channel assignment message indicates assignment of the first and second channels to the first tool.

19 Claims, 13 Drawing Sheets

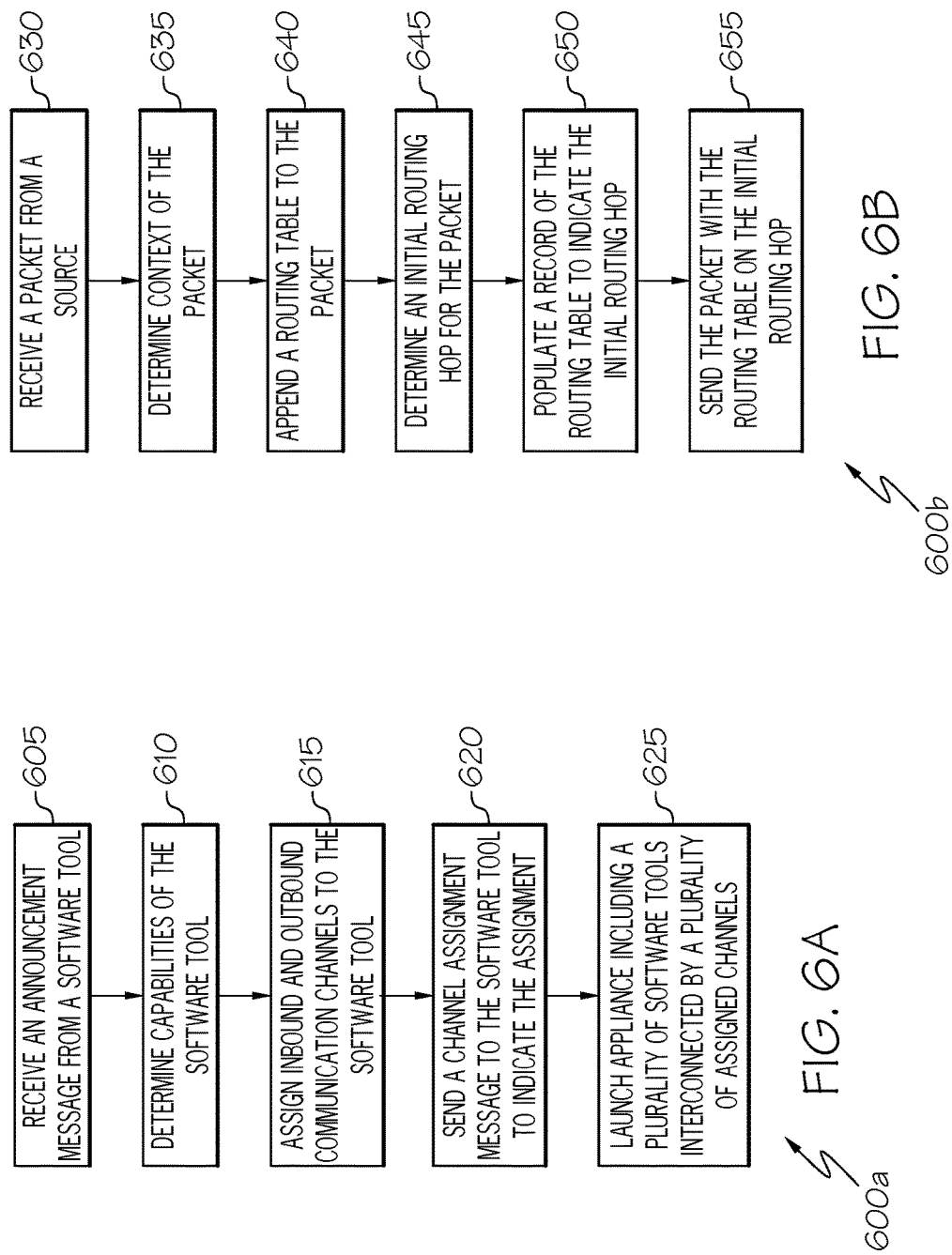

CONTAINER-BASED SOFTWARE APPLIANCE

BACKGROUND

The present disclosure relates in general to the field of software system analytics, and more specifically, to a container-based system analytics appliance.

As software applications become increasingly sophisticated, their complexity also increases, along with the number and variety of underlying components. Developing a complex software application may be challenging, as its numerous components must each be developed, configured, tested, and maintained. Configuring a software application, for example, may become very difficult as the number of its underlying components increases. Further, some software systems may be developed according to customized or proprietary designs or requirements. Security, performance analytics, and other tools used as general purpose solutions to support the development and maintenance of software systems may be deficient for performing similar services to such custom, proprietary, or legacy systems.

BRIEF SUMMARY

According to one aspect of the present disclosure, an announcement message can be received at a first software container in a software system on a control channel from a first tool hosted on a second software container in the software system, where the first software container hosts a system controller. Capabilities of the first tool can be identified at the system controller and a first channel and a second channel can be assigned to the first tool based on the identified capabilities. The first and second channels may be software-based communication channels in the software system, the first channel is assigned to the first tool for use in sending messages to other tools in the software system, and the second channel is assigned to the first tool for use in receiving messages from other tools in the software system. A channel assignment message may be sent to the first tool on the control channel, where the channel assignment message indicates assignment of the first and second channels to the first tool.

According to another aspect of the present disclosure, a packet is received at a particular component of a system including a plurality of components, where the plurality of components are each hosted on a respective one of a plurality of software containers. The packet can be processed to determine context information for the packet and a first destination may be determined for the packet based on the context information, where the first destination includes a first one of the plurality of components hosted on a first one of the plurality of software containers. A routing table can be appended to the packet and a record of the routing table can be populated to indicate routing to the first component. The packet can be sent with the appended routing table to the first component, among other example aspects discussed herein.

BRIEF DESCRIPTION OF THE DRAWINGS

FIGS. 6A-6B illustrate flowcharts showing example techniques involving an example appliance to be composed of multiple interconnected container-based tools.

Like reference numbers and designations in the various drawings indicate like elements.

DETAILED DESCRIPTION

Figure 1:
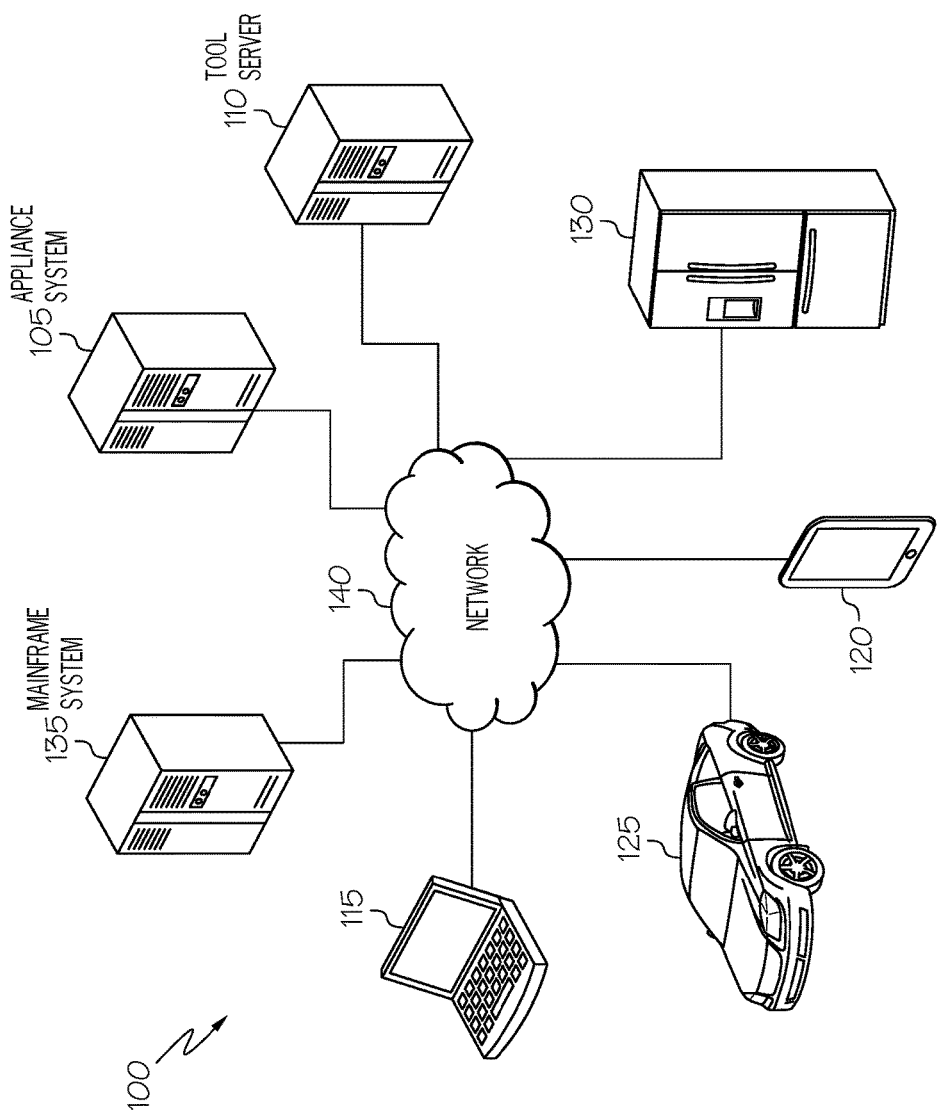
FIG. 1 illustrates a simplified schematic diagram of an example computing environment including an example appliance system.

As will be appreciated by one skilled in the art, aspects of the present disclosure may be illustrated and described herein in any of a number of patentable classes or contexts, including any new and useful process, machine, manufacture, or composition of matter, or any new and useful improvement thereof. Accordingly, aspects of the present disclosure may be implemented entirely as hardware, entirely as software (including firmware, resident software, micro-code, etc.), or as a combination of software and hardware implementations, all of which may generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider), or in a cloud computing environment, or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices, to produce a computer implemented process such that the instructions which execute on the computer or other programmable apparatus provide processes for implementing the functions/acts specified in the flowchart and/or block diagram block or blocks.

FIG. 1 illustrates a simplified schematic diagram of an example computing environment 100 for implementing software systems. In some embodiments, computing environment 100 may include functionality for hosting multiple interconnected software containers, each representing a distinct user-space or runtime instance. Components, such as particular diagnostic or data analytic tools, event handlers, or databases, may each be hosted in a respective one of these containers. A collection of these components may be defined and interconnected as an appliance, configured to perform certain functionality enabled by defined interactions and flows between components in the appliance. Such a container-based approach can simplify adoption and utilization of such an appliance, allowing the appliance to interface with and operate on data from a wide variety of systems and system types. Further, users may custom-define such appliances, selecting a specific combination of components and defining the interactions and data flows that are to take place between the components.

In one example, an appliance system 105 may be provided, which may host an appliance manager capable of building a custom software appliance composed of a collection of software containers each hosting a respective tool that is to implement various different functionality of the appliance. The appliance manager may facilitate and build various appliances according to a platform defining a system controller for the appliance, a control channel to be used by the system controller to configure and organize data flows and transactions between tools in the appliance, and software-based communication channels defined for use by the tools organized within the appliance. In some implementations, the same system (e.g., 105) hosting the appliance manager may also host the individual containers implementing an appliance organized and launched using the appliance manager. In other instances, one or more other computing systems separate or remote from the system hosting the appliance manager may be used to host one or more of the containers (and tools) used to host the appliance. In such instances, an appliance may be implemented using a distributed computing system.

A variety of different tools may be made available for use by an appliance system 105 in building various container-based appliances. For instance, a tool server 110 may be provided to host or otherwise provide access to a number of different tools. The tools may each provide some functionality that may be combined with functionality of other tools to realize a particular result. Some tools may further communicate and interoperate with backend systems supporting functionality of the tool (e.g., such as functionality requiring computing resources above and beyond what the software container may provide). In some cases, the tool server 110 may present a user interface to allow users designing an appliance to research and identify various tools that they may utilize and include an appliance to be designed by the user. In some implementations, the user interface may be or resemble a storefront, from which a user-designer may select a combination of tools and define interactions, transactions, or data flows between the tools, among other example implementations.

In some implementations, an appliance generated using an appliance system 105 (from software tools provided through one or more tool servers (e.g., 110)) may be implemented to perform analytics on data generated by another computing system. In some implementation, a system monitor external or internal (natively or added) may monitor a particular computing system and report performance characteristics of the system, transactions attempted or completed using the system, and other attributes of the system. Such system data (e.g., generated by the system or by a system monitor) may be provided to an appliance generated by the appliance system and hosted on a corresponding set of containers hosting tools implementing the appliance. The set of containers may be hosted on one or more computing systems. Computing systems for which data may by such an appliance may include mainframe computing systems (e.g., 135), Internet of Things (IoT) or other machine-to-machine (M2M) communication systems (e.g., composed of computing devices (e.g., 125, 130) disposed in non-traditional environments (such as automobiles (e.g., 125), household or industrial machines (e.g., 130)) and/or using other connected purpose-built or general purpose computing devices), or other computing systems.

A system (e.g., 100) may further include one or more end-user devices (e.g., 115, 120), which may be utilized in some cases to allow a user to interface with and interact with various other systems and components of the computing environment 100. For example, developer-users may utilize end-user devices 115, 120 to define a software appliance to be launched and generated by an example appliance system 105. For instance, a user may interface with appliance system 105 and/or tool server 110 over a network 140 utilizing an end user device (e.g., 115, 120), such as a desktop, laptop, tablet, smartphone, or other computing device. The user may select one or more tools for deployment within a container to be included in the appliance. The user may further identify one or more other tools with which the selected tool is to interact. For instance, the user may define a data flow and conditions for the various paths within the data flow. A system controller or other tool within the appliance may utilize this information to determine routes for data sent to the appliance for processing to cause the data to be routed from tool to tool within the appliance and realize the desired transactions and functionality of the appliance, among other examples.

User devices (e.g., 115, 120), in some examples, may be included in a computing system that is to be analyzed using example appliances generated by the appliance system 105. For instance, an IoT or other M2M system may include a variety of different devices interoperating together, including one or more user devices (e.g., 115, 120). Indeed, user devices may be extended to include devices such as wearable devices (e.g., smart watches, smart glasses, headsets), smart appliances (e.g., televisions, audio systems, home automation systems, refrigerators, washer/dryer appliances, heat-ventilation-air-conditioning (HVAC) appliances), and the like. As M2M systems may be custom-defined and built from a unique combination of interconnected computing devices, diagnostic tools tuned specifically to such systems may be difficult or impossible to find among general purpose or other market-available tools. Accordingly, custom-built appliances developed using an example appliance system 105 may be beneficial for such systems and other computing systems (e.g., mainframe systems 135) for which such diagnostic tools are as yet unavailable or of insufficient quality.

One or more networks 140 may be used to communicatively couple the components of computing environment 100, including, for example, local area networks, wide area networks, public networks, the Internet, cellular networks, Wi-Fi networks, short-range networks (e.g., Bluetooth or ZigBee), and/or any other wired or wireless communication medium. For example, an appliance system 105 may connect to and provide data to other computing systems over the network 140 to cause containers to be deployed on these systems with tools interconnected to implement a particular appliance defined using the appliance system 105. As some of these container-based tools may utilize services of other backend systems, networks 140 may additionally be used to connect the system hosting the container-based tool to the server system hosting the corresponding services, among other connections that may be utilized to facilitate the intercommunications and functionality of the computing environment 100.

In general, elements of computing environment 100, such as "systems," "servers," "services," "hosts," "devices," "clients," "networks," and any components thereof (e.g., 105, 110, 115, 120, 125, 130, 135, etc.), may include electronic computing devices operable to receive, transmit, process, store, or manage data and information associated with computing environment 100. As used in this disclosure, the term "computer," "processor," "processor device," or "processing device" is intended to encompass any suitable processing device. For example, elements shown as single devices within computing environment 100 may be implemented using a plurality of computing devices and processors, such as server pools comprising multiple server computers. Further, any, all, or some of the computing devices may be adapted to execute any operating system, including Linux, other UNIX variants, Microsoft Windows, Windows Server, Mac OS, Apple iOS, Google Android, etc., as well as virtual machines adapted to virtualize execution of a particular operating system, including customized and/or proprietary operating systems.

Further, elements of computing environment 100 (e.g., 105, 110, 115, 120, 125, 130, 135, etc.) may each include one or more processors, computer-readable memory, and one or more interfaces, among other features and hardware. Servers may include any suitable software component or module, or computing device(s) capable of hosting and/or serving software applications and services, including distributed, enterprise, or cloud-based software applications, data, and services. For instance, in some implementations, appliance system 105, tool server 110, mainframe system 135, and/or any other sub-system or component of computing environment 100, may be at least partially (or wholly) cloud-implemented, web-based, or distributed for remotely hosting, serving, or otherwise managing data, software services, and applications that interface, coordinate with, depend on, or are used by other components of computing environment 100. In some instances, elements of computing environment 100 may be implemented as some combination of components hosted on a common computing system, server, server pool, or cloud computing environment, and that share computing resources, including shared memory, processors, and interfaces.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
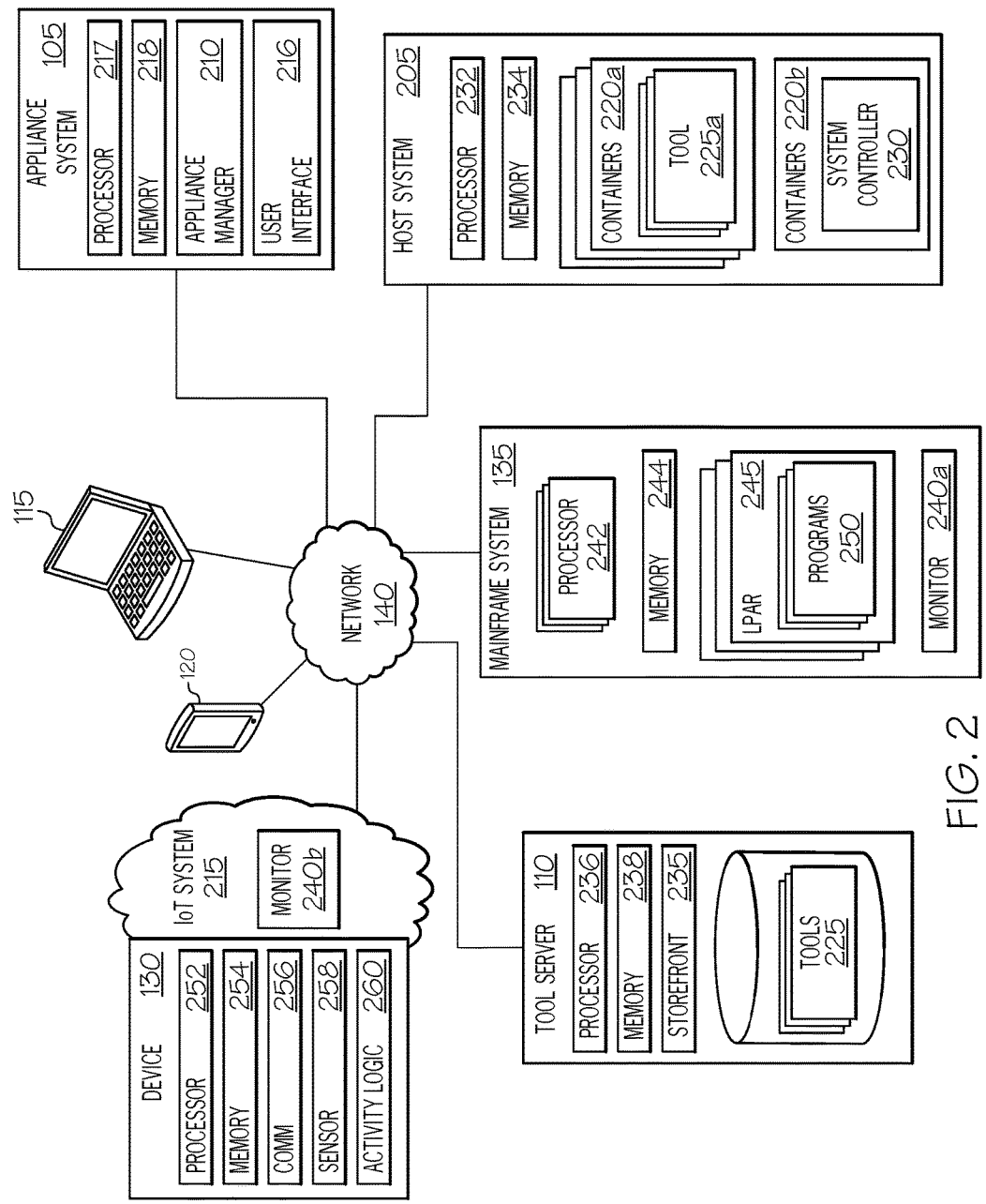
FIG. 2 illustrates a simplified block diagram of an example software system including an example appliance manager.

Turning to FIG. 2, a block diagram 200 is shown of an example system including an example appliance system 105 having an appliance manager 210 capable of generating container-based appliances implemented on one or more host systems (e.g., 205) (or the appliance system 105 itself) to provide custom-defined diagnostics to one or more subject systems, such as a mainframe system 135, an IoT system 215, a distributed communication environment, or other computing system. The custom appliance may be developed to be conveniently hosted on a system trusted by the subject system (or any other system capable of supporting containers and containerized software environments), and may advantageously address needs for diagnostic tools for custom, proprietary, or other systems for which diagnostic tools may be unavailable or insufficient.

In the example of FIG. 2, an appliance system 105 includes one or more processor apparatus (e.g., 217), one or more memory elements (e.g., 218), and components implemented using code stored on the memory elements 218 and executed by the processing apparatus 217, such as an example appliance manager 210. In some cases, appliance manager 210 may be further implemented using hardware components, such as hardware-based trusted execution environments, cryptographic logic, communication modules, and other hardware-based logic. In some implementations, a user interface 216 may be provided in connection with the appliance manager 210 to allow a user to define a combination of tools to be included in a customized appliance. The user interface 216 may additionally be used to modify a previously-generated appliance, for instance, to refine interactions and data flows defined for the appliance, add, delete, or replace tools within the appliance, change the system(s) hosting the containers implementing the appliance, among other example changes.

In some instances, an appliance system 105 may receive a selection of one or more tools (e.g., 225), which may be hosted on or otherwise provided by a tool source (e.g., 110). For instance, a tool server 110, in one example, may be separate from the appliance system 105 that is to build appliances using tools hosted by the tool server 110. In other instances, the appliance system (e.g., 105), itself, may embody the tool server 110. In the example of FIG. 2, tool server 110 may include one or more processor apparatus (e.g., 236), one or more memory elements (e.g., 238), and one or more components implemented in software and/or hardware for use in receiving selections of tools (e.g., 225) hosted by the tool server 110 and providing these tools (e.g., 225) for use by the appliance system 105 in generating a corresponding appliance. In one example, the tool server 110 may implement a tool storefront 235 to provide a user interface for the presenting details of various tools, which have been developed for inclusion in appliances built upon a particular appliance platform provided by appliance system 105. Users may thereby browse tools to determine which tools (and corresponding functionality) are available and select those most appropriate for inclusion in a particular appliance, among other examples.

An example appliance manager 210 may coordinate the launch and interconnection of containers (e.g., 220a-b) hosting various tools (e.g., 225a) selected for inclusion in an appliance designed and built using the appliance manager 210. In the example of FIG. 2, container-based tools (e.g., 225a) may be hosted on one or more host systems (e.g., 205). In some instances, all of the tools (e.g., 225a) (and their respective host containers (e.g., 220a)) may be hosted on a single host system 205 (e.g., a mainframe system, server, personal computing device, etc.). In other cases, the container-based tools (e.g., 225a) may be hosted across multiple physical computing devices, such as implementations in a distributed computing environment, cloud computing environment, or other host computing system. Accordingly, a host system 205 may include one or multiple processor apparatus 232, one or multiple computer memory elements, and other components, such as operating systems and applications utilized by the host system(s) 205 to support and host one or more software containers (e.g., 220a). For instance, a host system 205 may include logic to launch and configure the various software containers (e.g., Docker containers, Open Container Initiative (OCI) based containers, and/or any other software container implementation), and corresponding tools and microservices, software images, databases, network connections, filesystems, runtime environments, and deployment environments, among other examples.

In some cases, a custom software appliance may be composed of a collection of tools implemented using software containers, such as Docker containers, containers based on the Open Container Initiative (OCI), and/or any other software container implementation. Analogous to shipping containers, software containers may package a particular software component with all of its dependencies to ensure that it runs the same in any environment or infrastructure, out-of-the-box. For example, a software container may package everything required to run a particular software tool, such as the code, software libraries, configuration, files, runtime environment, and any other associated logic. Software containers may enable applications to be migrated across various infrastructures and environments without any modifications or environment-specific configurations. As a result, appliances instantiated using software containers may enable the appliances (e.g., through migration of its composit containers) to be migrated to or from local workstations, development servers, test environments, and/or production environments, etc. Software containers also enable individual tools to be developed using the best programming languages and technologies for each tools, without any internal conflicts from the requirements of different tools being combined together in a single appliance. Many inefficiencies of software development and deployment are eliminated with software containers, such as time spent configuring development and production environments, concerns about inconsistencies between development and production environments, and so forth. Software containers also avoid locking developers into any particular platform, software technology, and/or vendor. Software containers running on the same machine may also share a host operating system, thus avoiding the inefficiencies of virtual machines, which each require their own guest operating system on top of the host operating system. Accordingly, in comparison to virtual machines, software containers may launch faster and use less memory.

Software tools (e.g., 225a, 230) implemented using software containers (e.g., 220a, 220b) may be stored as container images on their respective host systems (e.g., 205), which may include all components and dependencies required to run a particular software component in a software container. A container image, for example, may be a file format used to package the components and dependencies of a containerized software tool 225a. Container images may be constructed using layered filesystems that share common files, resulting in less disk storage and faster image downloads. In some cases, container images may be hosted by a software registry (e.g., tool server 110) to provide a central repository for distributing container images (and their tools 225) to software developers. An example a host system 205 may support a container infrastructure including, for instance, an operating system and container engine to support the software containers 220b. Infrastructure includes the underlying hardware and/or software infrastructure used to provide the containerized environment, such as an application server. The operating system executing on the host 205 can be any operating system adapted to provide a containerized environment, such as Linux, other UNIX variants, Microsoft Windows, Windows Server, Mac OS, Apple iOS, and/or Google Android, among others. A container engine may include software responsible for providing and managing the collection of containers, such as a Docker container engine, an OCI-based container engine, and/or any other type of software container engine. Software containers 220*a*-*b* are containers that execute distinct software components in their own respective environments.

In one example, an appliance manager 210 may set forth an appliance platform to support any variety of appliances developed by a user. Each instance of an appliance may include its own respective instance of a system controller tool 230 hosted on its own corresponding container 220*b*. The system controller 230, in one implementation, may manage intercommunication between the containerized tools (e.g., 225*a*) selected to implement the appliance. For instance, a software communication bus may be defined over which the containerized tools 225*a* of the appliance are to communicate. A control channel may be defined within the software bus over which the system controller 230 may communicate with all of the various containerized tools 225*a*. Additionally, each tool 225*a*, upon being added to an appliance, may announce its addition to the system controller 230 via messaging over the control channel.

From attributes shared by a new tool with the system controller 230, the system controller can determine how the tool is to "fit" within the appliance. For instance, in the announcement message (or other messages exchanged between a new tool (e.g., 225*a*) and the system controller 230 the new tool can provide information including indications of the types of inputs it accepts, the types of results and data it output, among other information that may be used to pair or match the tool to other (existing or future) tools in the appliance. For instance, the system controller 230 may identify that a first tool provides outputs that correspond to a type of input accepted and used by the new tool (e.g., 225*a*) to determine that a channel should be defined between the first tool and the new tool, among other examples. For instance, a new tool, when advertising its capabilities and/or characteristic to the system controller 230 over the control channel, may additionally identify other tools with which the new tool is known to be compatible with or cooperate with. For instance, the new tool may advertise a set of potential tools known to provide acceptable inputs to the new tool and/or a set of tools know to accepts outputs generated by the new tool, among other example information. The system controller 230 may likewise utilize such information to identify opportunities to pair tools within the appliance and defined corresponding channels between such tools. In some implementations, user inputs may be provided as hints to the system controller to guide the assignment of channels connecting tools within the appliance. For instance, a user may define a custom connection between tools, define criteria for connections between one or more of the tools, override a connection defined between tools based on the system controller's channel assignments, among other examples. Accordingly, the system controller 230 can assign particular channels to each of the tools in the appliance to facilitate the overall functionality of the appliance. For instance, the system controller 230 may assign each tool one or more channels to listen on (i.e., receive messages from one or more other tools) and one or more other channels in the software bus to send messages on. Additionally, following the insertion of a tool in the appliance, the system controller 230 may manage the performance of the tool (during runtime) to manage load of the tool, replace or supplement underperforming or overloaded tools, or generate alerts for users to identify issues arising in the appliance, among other example functionality.

Containerized tools (e.g., 225) that may be included in a customized appliance may provide various functionality to enhance the capabilities of the appliance. For instance, examples of containerized tools may include categorization and classification tools, which may receive data and determine a context for the data. Such tools may be used, for instance, to determine an initial routing of the data within the appliance. For instance, based on the context of data, the data may be routed along one of potentially multiple alternative data/transaction paths within the appliance. Data paths may further include one or more tools that perform various data analytics tasks on data received by the appliance. An initial tool, such as a tool equipped with data classification or context determination logic may additionally augment received data to provide routing information with the data. In one example, an incoming quantum of data (e.g., a packet) capable of being processed by the appliance may be augmented by one of the tools to append a routing table to the data to record "hops" between tools and identify a next destination tool for the data (following processing of the data by another tool), among other example implementations.

An appliance may additionally include various data analytics tools, which may each be respectively equipped with logic to perform data analytics according various algorithms and techniques. For instance, some tools may apply various machine learning-based analytics techniques, some tools may apply other algorithms directly at the tool to generate one or more results, some tools may preprocess data and interface with a backend service to provide the preprocessed data to the backend service for processing (e.g., with the results of the backend service then received at the tool and re-packaged for processing by additional tools in the appliance), among other example tools. As an example, a containerized tool may be provided and introduced to a system controller for addition to the appliance that has functionality to analyze data relating to a subject system and detect anomalies that occur concurrently in time. For instance, a cluster detector tool may be provided to automatically infer topologic, hosting or other dependencies from data processed by the tool. Complimentary tools may also be provided (e.g., with a cluster detector tool), such as, in this example, another tool equipped to detect time separated recurrent events to establish causality between events identified using the cluster detector tool, among other examples. Other tools may be provided to generate alerts or actuate other services, tools, or systems in response to data analytics results generated by data analytic-type tools in the appliance. In some cases, actuator or alert tools may interface with systems external to the appliance and generate an alert, command, or other data for consumption by outside tools. In other instances, actuator or alert tools may provide or contribute to a user interface associated with the appliance to generate data for consumption by a user, among other examples. Still other tools may be selected and included in an appliance to provide a repository for results generated other tools (e.g., alert tools, analytics tools) provided in an appliance. Such tools may provide, for instance, databases or other structure data repositories. In some cases, a routing table appended to data processed by the appliance (and recording the routing hops between tools in the appliance) may likewise be stored for processing by other systems or tools in a repository provided through a repository tool in the appliance. Various types of repositories may be provided by various types of containerized tools included in the appliance, among other example implementations.

Data to be processed by an appliance may be sourced from various systems. For instance, an appliance may be provided with tools to perform analytics on the results and/or performance of another computing system, such as a mainframe system (e.g., 135), IoT system 215, enterprise system, web service, or other example computing system. In some cases, a subject computing system (e.g., 135, 215) may be provided with a system monitor (e.g., 240*a,b*) that may intercept and/or log result data generated by various components within the system. Such data may then be provided as inputs to an appliance designed to perform analytic tasks on the data. Data generated by a system monitor (e.g., 240*a,b*) may alternatively or additionally describe functional characteristics of the subject system, such as memory usage, processor usage, or network usage of various components of the subject system, transaction latency in the system, transaction rates within the system, or other parameters specific to or otherwise of interest to an administrator of a particular system and/or designer of an appliance built to analyze such parameters.

As introduced above, subject computing systems may include such examples as mainframe computing systems (e.g., 135). A mainframe computing system may include processor apparatus (e.g., 242) and computer memory 244 (e.g., implemented at least in part through physical and/or virtual tape drives) on which potentially multiple logical partitions (LPARs) 245 may be implemented. An LPAR may represent a logical division of the processor, memory, and storage resources of the mainframe system 135 that can be utilized independently with its own operating system instances and programs (e.g., 250). Further, one or more regions can be included within a mainframe 135, each region forming a collection of mainframe resources controlled as a unit and used within the system to perform one or more tasks. Such resources can include, for example, programs (e.g., 250), Basic Mapping Support (BM) map sets, transactions, terminals, files, transient data queues, temporary storage queues, among other examples.

Other systems may provide data for analysis by an appliance generated using an example appliance system. For instance, an IoT system 215 may be composed of multiple interconnected devices (e.g., 130) interoperating to perform enhanced functionality or services. Example IoT devices (e.g., 130) may include one or more computer processor apparatus 252, one or more memory elements 254, a communication module 256 to facilitate communications with one or more other devices within the IoT system, or one or more centralized communication hubs, or IoT gateway devices within the IoT system. Devices 130 may include IoT resources, such as sensors 258 to generate data for consumption by other logic or devices (e.g., actuators) within the IoT system. Each device 130 may additionally include respective activity logic 260 defining the actions and functionality of the device, including the control and/or management of sensor, actuator, storage, or processing resources of the device, which are used in combination with other resources provided by other devices within the IoT system. In some cases, an IoT system may include a system manager, which may include a system monitor 240*b* or other logic to monitor data, orchestrate interoperability of heterogeneous devices within the IoT system 215, and determine events within the IoT system 215, among other examples.

Figure 3:
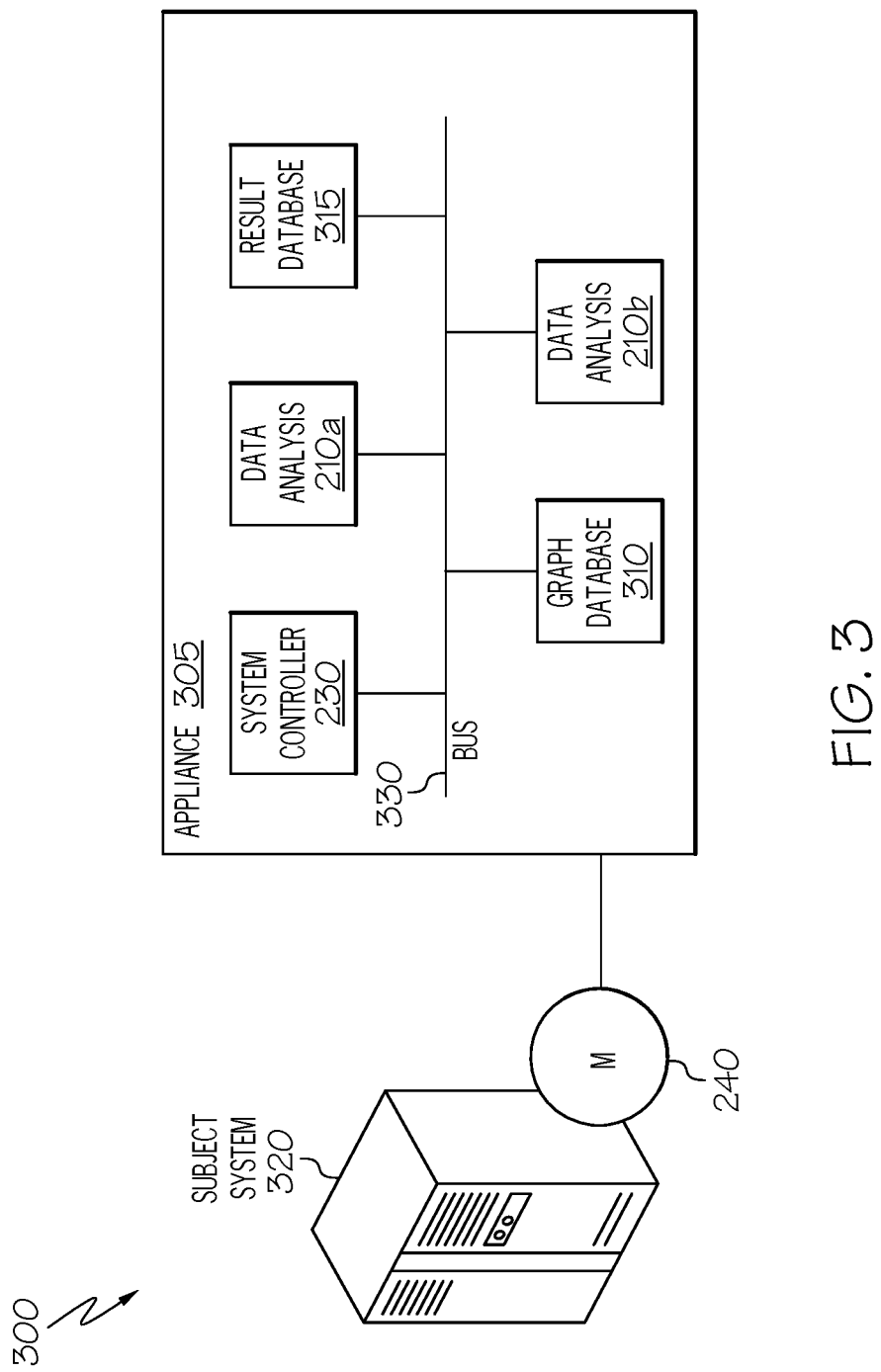
FIG. 3 illustrates a simplified block diagram of an example container-based software appliance.

Turning to FIG. 3, a simplified block diagram 300 is shown illustrating an example appliance 305 composed of a collection of containerized tools (e.g., 230, 210*a*, 210*b*, 310, 315) interfacing with an example subject system 320. In this example, the subject system 320 may include a system monitor element 240 to collect and/or generate data from monitoring of the subject system 320 to describe performance attributes or results of transactions performed by the subject system 320. Data generated from the monitoring of the subject system 320 by the system monitor 240 may be provided to an appliance 305 implemented using a network of containerized tools (e.g., 230, 210*a*, 210*b*, 310, 315). In some cases, data generated by the system monitor 240 may be stored in a data store and accessed by the appliance 305 for later processing. In other cases, the system monitor 240 may provide input data to the appliance 305 as it is generated by the system monitor 240 during monitoring of the subject system 320 (e.g., and thereby provide real-time analytics of the subject system's performance, etc.).

The appliance may be built according to a reusable appliance template or framework, which may provide one or more standard tools and a software bus 330 to enable intercommunication between the containerized tools (e.g., 230, 210*a*, 210*b*, 310, 315). A system controller tool 230 may be provided to build, organize, and manage the network of interconnected tools implementing the appliance 305. For instance, a dedicated control channel may be provided on the bus 330 and utilized by the system controller 230 to manage performance of the appliance. A classification component (e.g., 310) may also be provided and may be designated as the first tool to inspect and/or otherwise process data as it is received at the appliance 305 (e.g., from system monitor 240). In one example, a graph database 310 or other tools capable of inspecting an incoming packet and determining a context or type of the packet may be provided. From this initial assessment of the packet, the graph database 310 may prepare the packet for further processing and may make an initial routing determination (e.g., based on applying a graph structure of the graph database tool 310 to the incoming packet) to cause the packet to be subsequently analyzed by one of the other tools in the appliance 305. In one example, this classification component may append a routing table or other routing data to the packet to direct and record the data flow path of the packet through the appliance. For instance, the graph database tool 310 may determine that the packet is to be first routed to a first analytics tool 210*a* (rather than a second analytics tool 210*b*). The first analytics tool 210*a* may process the packet and based on the results of the processing may conditionally route the packet along one of potentially multiple different data flow paths, among other example implementations. A final result may be generated, in some examples, and routed to a repository tool, such as a database tool 315 hosted in another one of the containers of the appliance 305. The subject system 320 or another system (e.g., a system used to administer or otherwise manage the subject system 320) may then access these results from the repository (e.g., of database tool 315), among other example implementations.

Turning to the examples shown in the simplified block diagrams 400*a-g* of FIGS. 4A-4G, the example management of an example container-based, customized data analytics appliance (e.g., 305) is illustrated. As noted above, in some implementations, each appliance may be outfitted with at least a system controller 230 and a software bus 330 capable of supporting multiple data channels (facilitating communication between containerized tools of the appliance), as well as a dedicated control channel 405 enabling messaging in support of the control functionality of the system controller 230. In some implementations, the appliance 305 may further be provided with one or more interfaces (e.g., 410*a,b*) to enable data to be received at the appliance from outside sources and to allow result data to be transmitted to or otherwise accessed by other systems from the appliance 305 following processing of data by the appliance 305. In some implementations, interfaces (e.g., 410*a,b*) of the appliance 305 may be provided through one or more container-based tools selected for inclusion in the appliance 305.

In one example, an instance of a system controller 230 may be provided in each appliance 305 based on a particular appliance framework. The system controller may communicate bi-directionally over a dedicated control channel 405 over which any other tool in the appliance 305 may send and receive messages with the system controller 230. In one implementation, the control channel may be the only bidirectional channel of the appliance, with other data channels of the bus 330 being unidirectional, among other example implementations. Turning to FIG. 4B, a new tool 210*a* may be added to the appliance 305, for instance during the initial building of the appliance or during a modification of an existing (previously generated) appliance. In accordance with an example appliance framework, the new tool 210*a* may be loaded onto a corresponding container and send an arrival message 415 on the control channel 405 of the appliance 305. All messages sent on the control channel by a tool other than the system controller 230 may be automatically directed to the system controller 230. In some implementations, the arrival message 415 may include or may be immediately followed by an announcement message that indicates attributes of the new tool 415 to the system controller 230. This message (e.g., 415) may include an advertisement of the type of the tool, functionality or capabilities of the tool, a source of the tool, a name of the tool, capacity of the tool (e.g., number or rate of transactions capable of being handled by the tool 210*a*), a serial number, version number, or other tool identifier, among potentially other attribute information. The system controller 230 may identify capabilities of the new tool 210*a* based on this message and may determine a set of transactions in which the new tool 210*a* may support when paired with various other tools in the appliance 305. Based on the determination of these capabilities and/or transactions, the system controller 230 may assign one or more data channels to the tool 210*a* on which the tool 210*a* is to listen for messages from other tools. The system controller 230 may further assign one or more additional data channels on which the system controller 230 is to send messages in order for these messages to reach other tools in the appliance 305. Such channel assignments made by the system controller 230 during the initial building of the appliance 305 may forecast or pre-emptively instrument the appliance 305 for various transactions, which may only be realized if a particular set of tools ends up being added to the appliance 305.

Upon determining the capabilities of the new tool 210*a*, the system controller may send a channel assignment message 420 to the new tool using the control channel 405. In some implementations, the control channel 405 may be shared by all tools in the appliance 305. In order for a tool to determine that a message (e.g., 420) transmitted by the system controller 230 is intended for it and not another tool in the appliance, the system controller 230 may provide address or routing information or another identifying information with the outgoing message (e.g., 420) to identify the tool (e.g., 210*a*), for which the message (e.g., 420) is intended. The channel assignment message 420 may identify to the tool 210*a* channel identifiers corresponding to the assigned channels and indicate which channel(s) is/are for sending messages to other tools and which are for receiving messages from other tools. In some implementations, channel assignments may correspond to particular functions or capabilities of the tool (e.g., 210*a*), such that complimentary functions of other (e.g., later added) tools may be identified to determine potential cooperative relationships between tools and assign data channels to enable communications between these tools to facilitate corresponding transactions, among other examples.

Figure 4A:
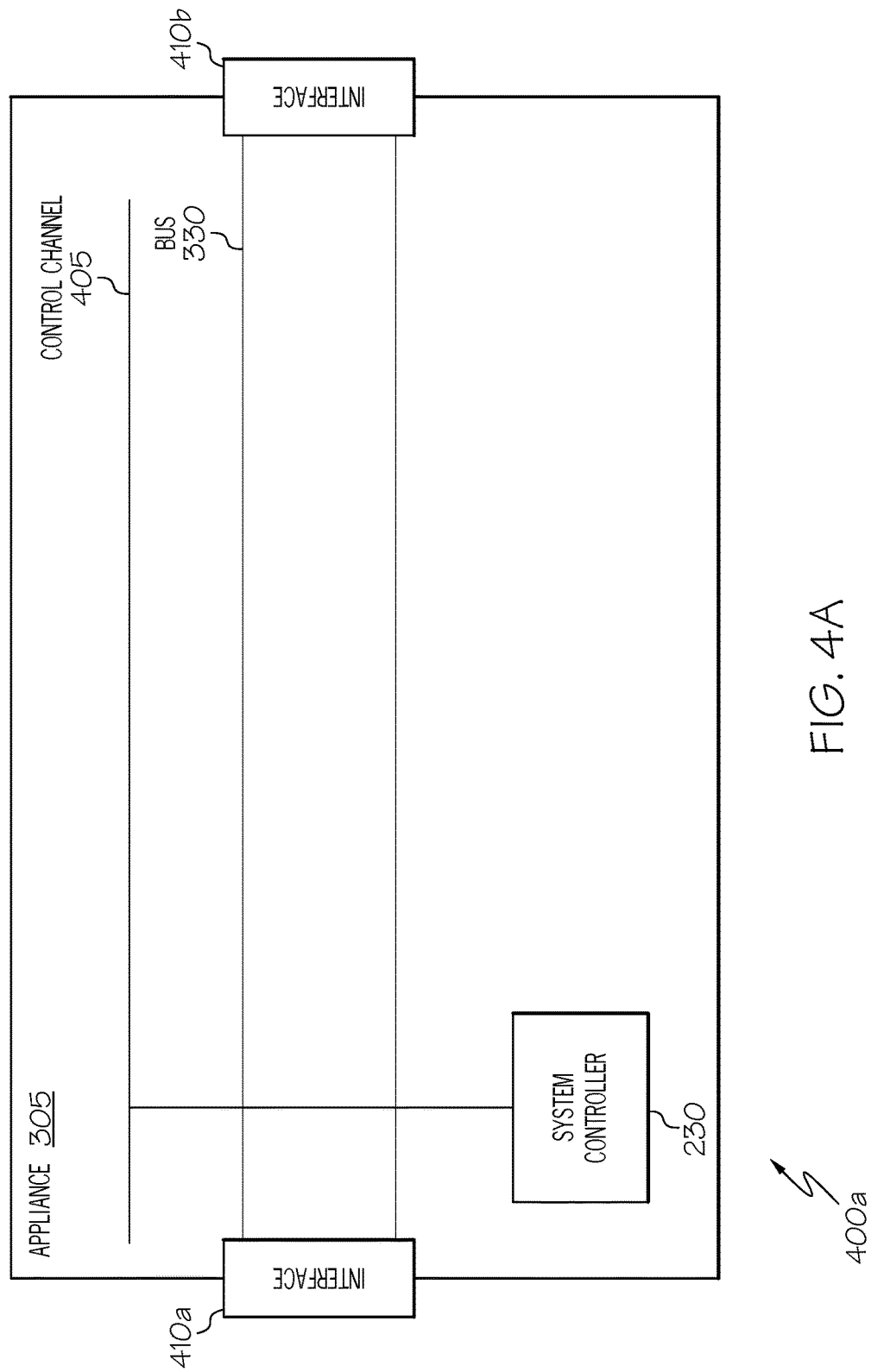
FIGS. 4A-4G illustrate simplified block diagrams representing examples involving an example container-based software appliance.
Figure 4B:
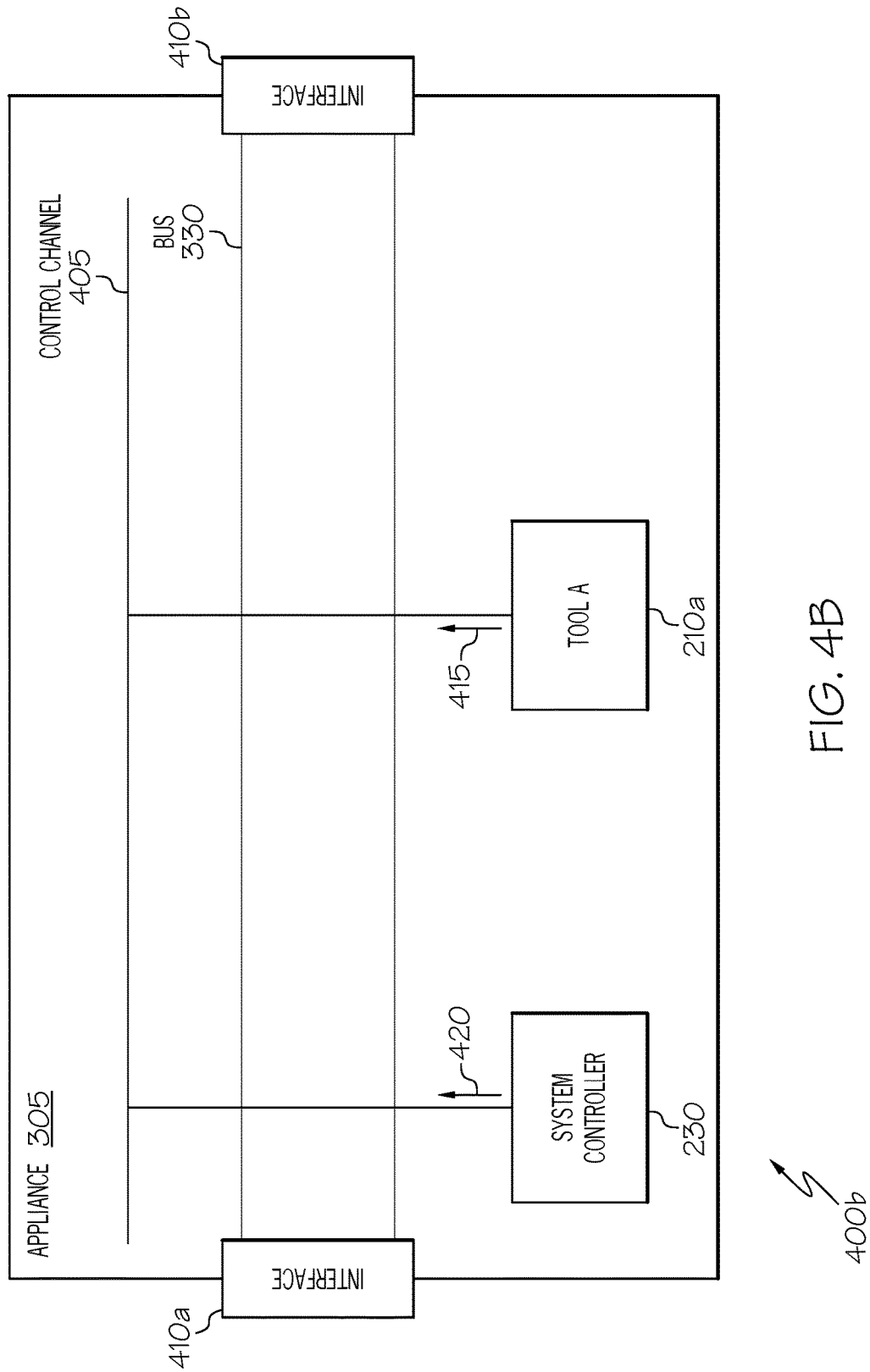
Figure 4C:
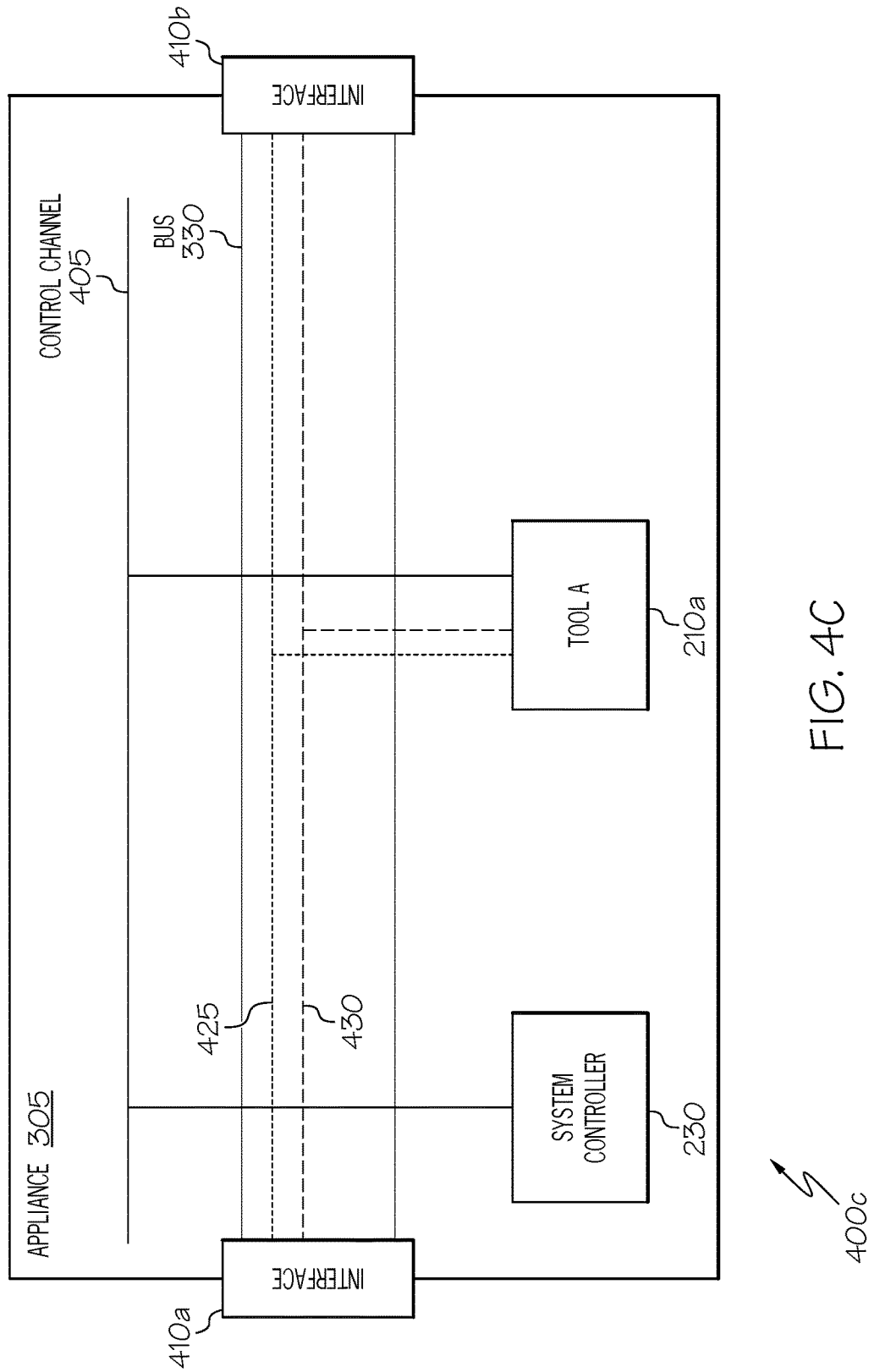

Turning to FIG. 4C, in connection with sending a channel assignment message 420, a system controller tool (hosted on a respective container used to implement appliance 305) may reserve certain (virtual) software channels (e.g., 425, 430) of the software bus 330 corresponding to the assignments. In the particular example of FIG. 4C, the system controller 230 has assigned a first channel 425 for the tool 210*a* and designated the channel 425 for the sending of outbound messages by the tool 210*a* (or "Tool A"). Further, the system controller 230 has assigned a second channel 430 to Tool A 210*a* for listening or receiving inbound messages from other tools in the appliance 305. In some instances, at least a subset of the data channels on the software bus 330 of the appliance 305 may also be connected to input or output interfaces (e.g., 410*a*, 410*b*) to allow data received at the appliance 305 to be provided directly to particular tool or for data generated by the particular tool to be directly output, from the appliance 305, to an outside system, among other examples.

Figure 4D:
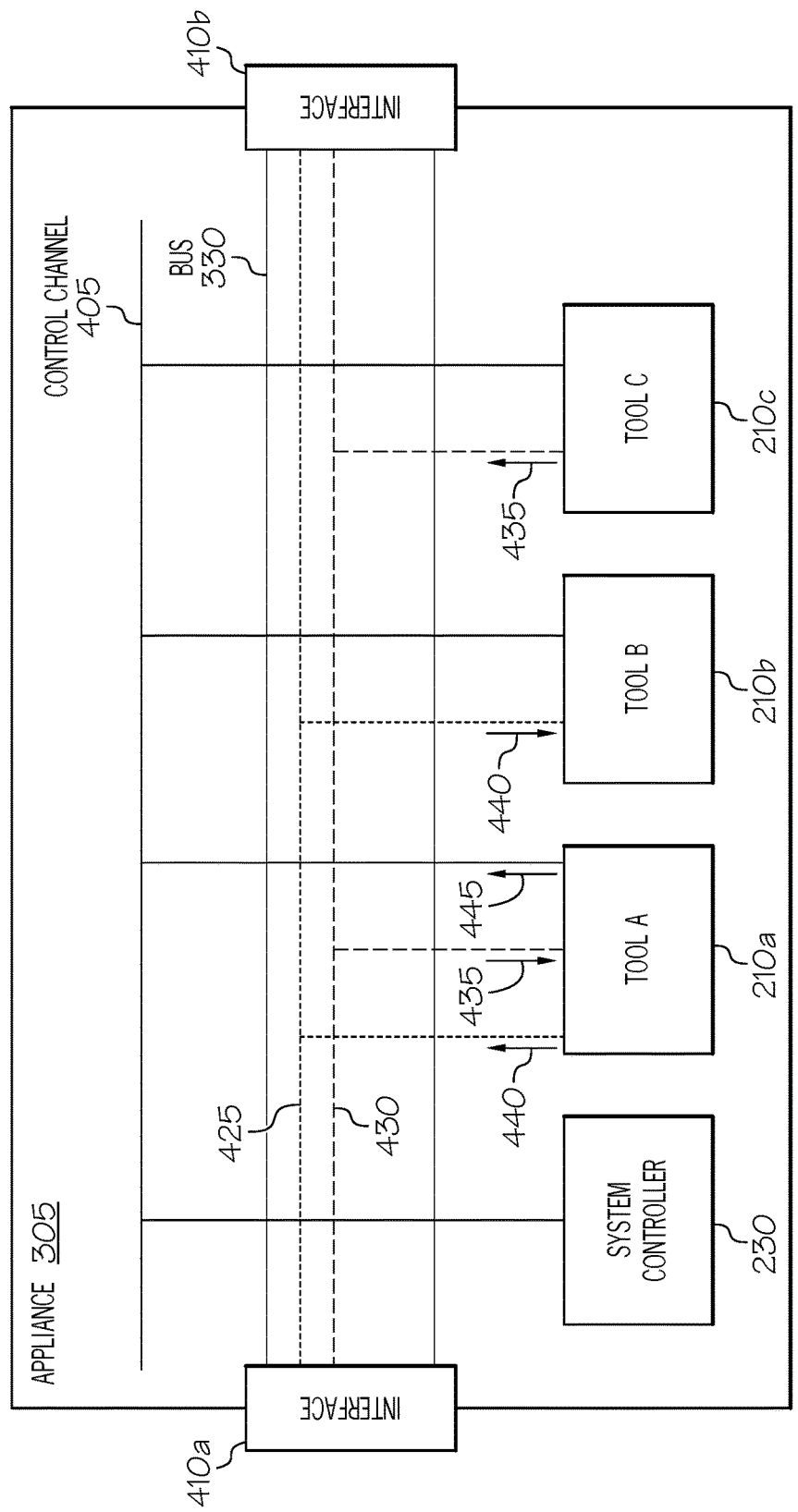

Continuing with the previous example, as illustrated in FIG. 4D, the example appliance 305 is shown following the addition of other tools (e.g., Tool B (210*b*) and Tool C (210*c*)). With the addition of these tools 210*b-c*, the system controller 230 may likewise receive arrival or announcement messages on the control channel 405 to identify capabilities of each of the tools 210*b-c* and make channel assignments (with respective channel assignment messages sent from the system controller 230 to each of the new tools 210*b-c*, respectively). For simplicity in illustrating the present example, only a portion of the assigned software bus channels and channel connections are shown. For instance, Tool B 210*b* may be assigned channel 425 as one of the channels on which the Tool B 210*b* is to receive messages from other tools. Because channel 425 is also assigned to Tool A 210*a* as one of the channels on which Tool A is to send messages, the assignment of the channel 425 by the system controller 230 serves to define a messaging path (and corresponding data flow path segment) from Tool A to Tool B. The assignment of channel 425 to each of the tools in this manner may be based on a recognition (e.g., by the system controller 230) that Tool B possesses capabilities that may utilize outputs of or build upon the capabilities of Tool A, such that data processed by Tool A or results output by Tool A may be used as inputs by Tool B. Further, in this example, Tool C is assigned channel 430 as an output channel to send messages to any tools (e.g., Tool A 210*a*) assigned the same channel 430 as in input, or listening, channel. In some cases, two tools may be bi-directionally compatible, such that either tool may be dependent on, or process data, prior to the other. In other cases, two tools or tool types may be compatible in only one direction, with one tool type only able to provide inputs to the other, and not vice versa.

Continuing with the example of FIG. 4D, example messages are shown using the assigned channels 425. For instance, the channel assignments may facilitate a particular data flow. As an example, a data packet may be received at the appliance 305 and inspected. Based on the inspection, the data packet may be first sent to Tool C 210*c* (e.g., on a third channel (not shown) assigned to Tool C for receiving data). Tool C 210*c* may perform processing according to a data analytics algorithm or other functionality of the tool 210*c* and determine a result, such as result data reporting a result of the processing or a post-processed version of the data packet, among other examples. Tool C may be configured to output results on one or more data channels (e.g., 430). In some instances, Tool C may be assigned multiple different output channels and Tool C may be provided with logic to send an output on a specific one of the multiple output channels based on the results of Tool C's processing. In this example, Tool C sends its output 435 on channel 430, which has been assigned as the receiving channel for Tool A 210a, causing the output message 435 of Tool C to be received by Tool A. In other implementations, multiple different tools may be assigned to listen to and receive messages sent on a particular channel (e.g., 430). In such examples, the output message 435 may be potentially be multi-cast to multiple different tools (including Tool A 210a), among other examples.

Continuing with the simplified illustrative example of FIG. 4D, Tool A receives an output 435 generated by Tool C on data channel 430 and processes the data (e.g., based on functionality corresponding to Tool A's connection to channel 430). In some instances, a tool may support multiple different transactions, operations, or functions, with multiple input channels assigned to the tool, with some of the channels corresponding to some of the different functions and other channels corresponding to other functions of the same tool. Upon receiving the output message 435, Tool A may process the received data 435 (e.g., to employ further data analytics, generate a corresponding event or alert, or apply other processing) to generate an output of its own. As Tool A 210a has been assigned a channel 425 for the sending of its result or output messages (e.g., 440) and Tool B 210b has been assigned the same channel 425 for receiving messages, these channel assignments (derived by system controller 230) may cause the output of Tool A 210a to be automatically directed along a data flow segment to Tool B 210b for further processing, as shown in this example. Tool B may then process the received data 440, determine further routing of the transaction, and so on, as with the processing performed by Tool C and Tool A in this example. Accordingly, by virtue of the channel assignments made by the system controller 230, specific data flow between containerized tools (e.g., 210a-c) in the appliance 305 may be defined. For instance, here, a flow is shown, based on these channel assignments, from Tool C to Tool A to Tool B, among other potential examples and features.

Figure 4E:
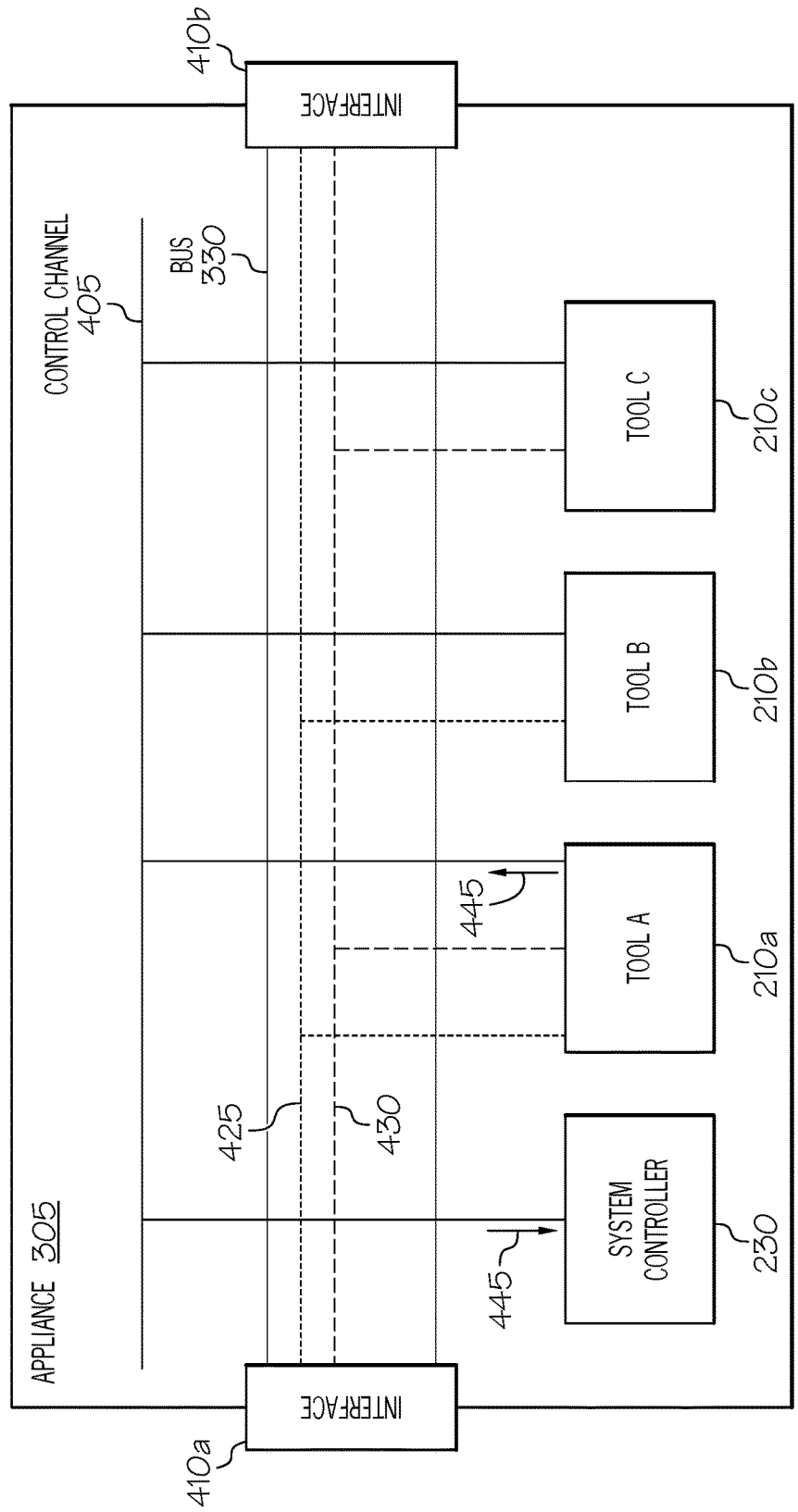
Figure 4F:
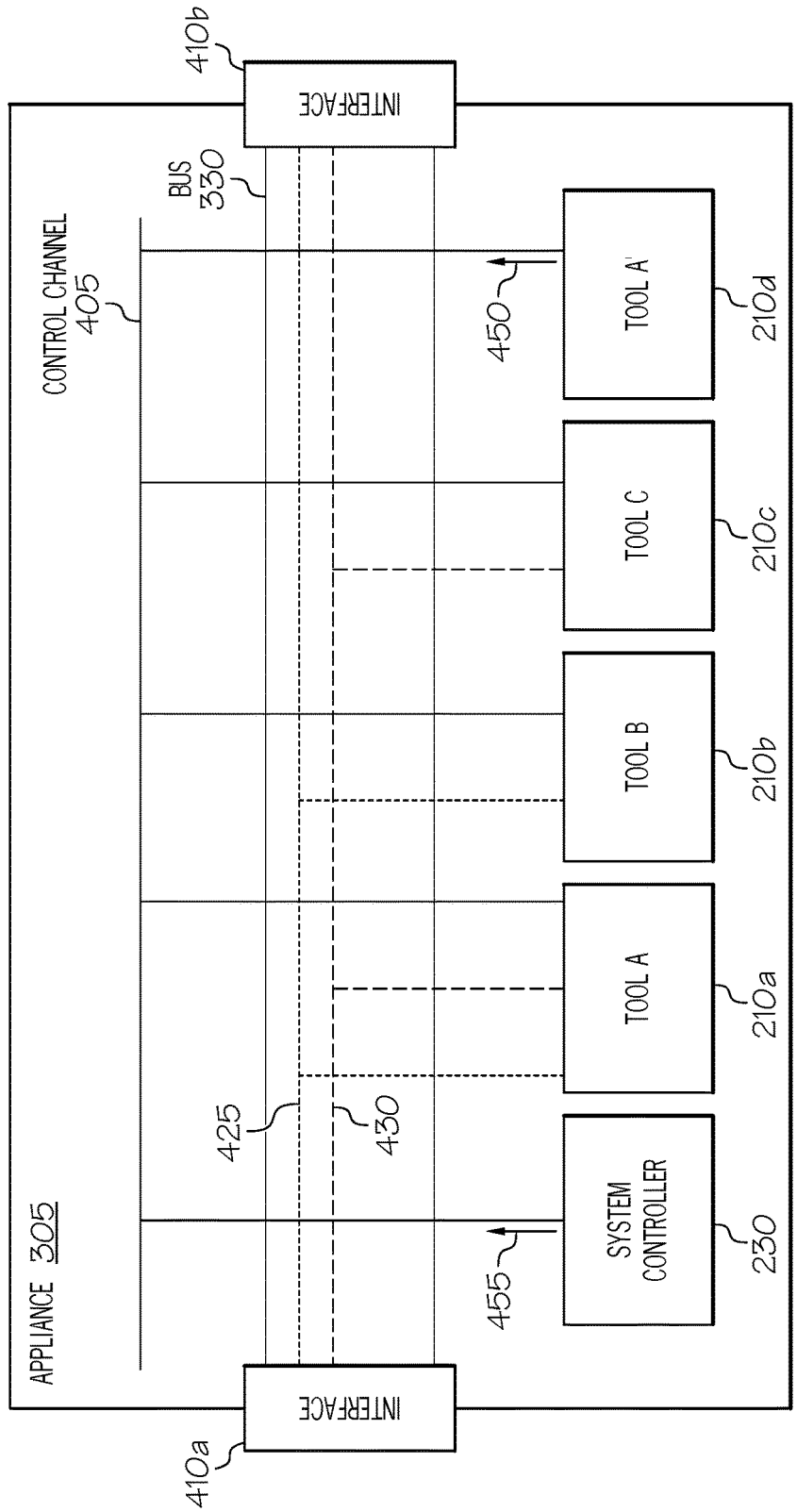

FIG. 4D provides an illustrative example of an appliance 305 processing data utilizing various component containerized tools during runtime, while FIGS. 4A-4C may represent activities of the system controller during design or implementation time of the appliance 305. Continuing further with a runtime example, FIG. 4E illustrates that the various tools (e.g., 210a-c) implemented in an appliance 305 may additionally use a control channel 330 of the appliance 305 during runtime. For instance, each tool may send a heartbeat message 445 to the system controller occasionally or according to a defined period or schedule. The heartbeat messages (e.g., 445), like other communications with a system controller 445, may take place using the designated control channel 405 on the bus 330. The heartbeat message 445 may communicate performance and health information of the tool (e.g., 210a) to the system controller 230. The absence of a heartbeat message from a given tool during a duration of time may be further interpreted by the system controller 230 as an indication of ill health or other dysfunction at the corresponding tool. Accordingly, each heartbeat message may, at minimum, identify the tool from which the heartbeat message emanates. Heartbeat messages (e.g., 445), in some examples, may additionally include more detailed information concerning the source tool. For instance, heartbeat messages (e.g., 445) may report performance characteristics and history of the tool (e.g., 210a) during a window of time preceding the heartbeat message (e.g., 445). The system controller 230 may utilize heartbeat messages received from the various tools (e.g., 210a-c) provisioned for the appliance 305 to determine the status, performance, and health of each tool, including the tool's container and host system. From this information, the system controller 230 may identify issues that transpire or are on the horizon and take remedial or preventative action to address the issues identified from the heartbeat messages received on the control channel 405. For instance, a system controller 230 may interface with an appliance manager and cause a particular container and/or tool to be relaunched on a given host system or to be migrated to another host system (e.g., to relaunch and failed containerized tool or improve performance of a tool) based on information obtained from a corresponding heartbeat message (or the lack thereof). In other examples, the system controller 230 may cause a substitute container and/or tool to be identified and trigger the replacement of a problem tool with the identified substitute or replacement tool in response to determining issues with the tool to be replaced. In still other examples, a system controller 230 can identify bottlenecks within an appliance resulting from one or more tools being overloaded or lacking the capacity to handle an increasing traffic load at the appliance 305. For instance, the system controller 230 may identify from tool performance parameters described in a heartbeat message (e.g., 445), that the tool (e.g., 210a) is running at or above capacity. To remedy the condition, as shown in the example of FIG. 4F, the system controller 230 may cause the tool to be cloned, such that another instance of the same containerized tool (e.g., 210d) is introduced and included in the appliance 305. Using this cloned tool instance, a portion of the workflow previously handled by the one tool 210a alone may now be shared between two instances (e.g., 210a, d) of this tool (e.g., Tools A and A'). As with the addition of other tools to the appliance, the addition of a cloned tool instance (e.g., 210d) may begin with the tool confirming its presence to the system controller 230 via one or more announcement messages (e.g., 450).

Figure 4G:
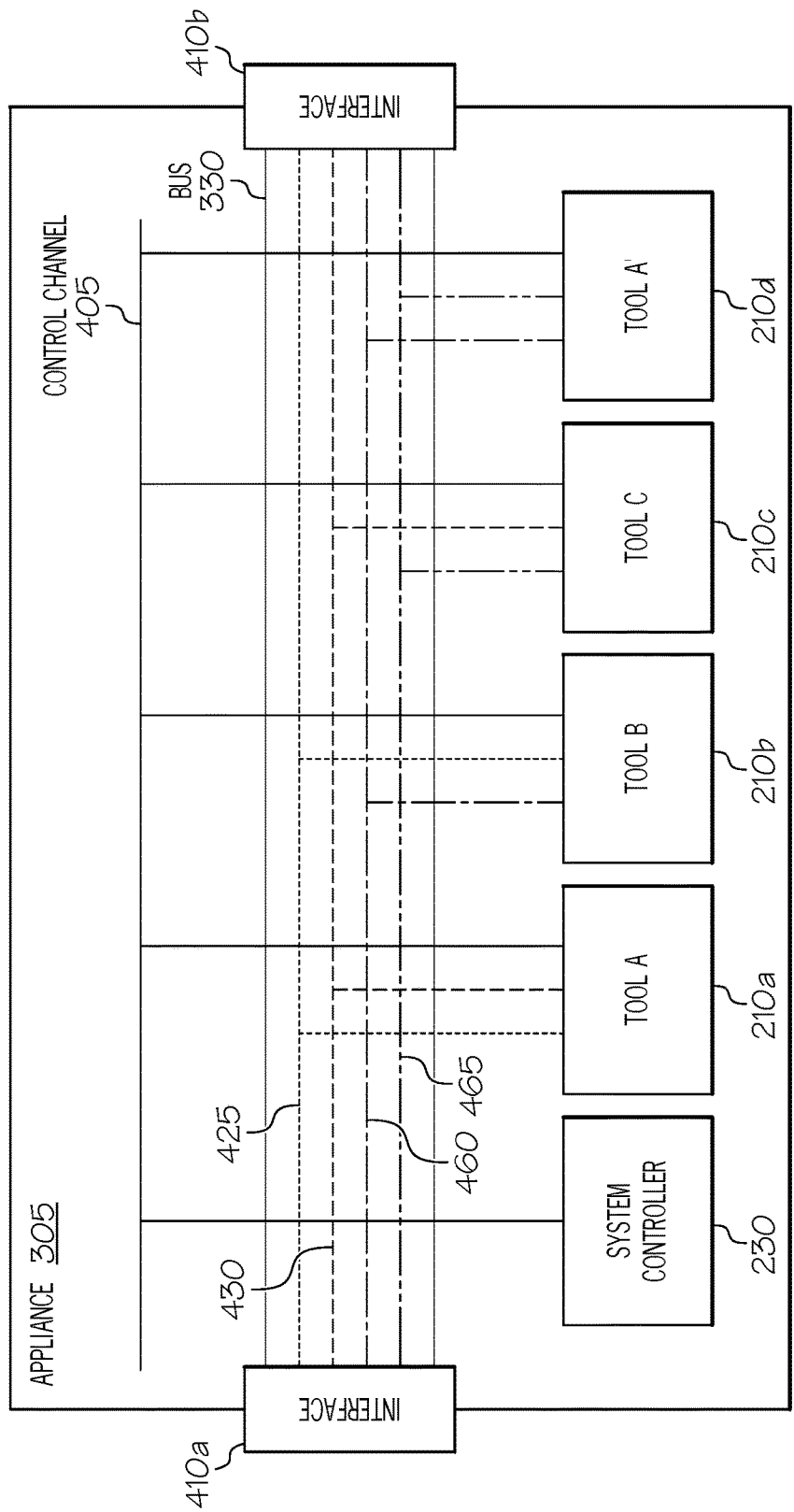

Continuing with the example of FIG. 4F, a system controller 230 may orchestrate the cloning of one or more tools in the appliance 305 in a manner similar to the removal, addition, and/or replacement of tools in the appliance. In some implementations, the system controller 230 may interface with an appliance manager, which may receive notifications or requests from the system controller 230 to cause additional containers to be launched, by the appliance manager, on the same or additional host systems hosting other containerized tools of the appliance 305. In the example of FIG. 4F, the system controller 230 can request that another instance of Tool A 210a be instantiated in a respective container and introduced to the appliance (e.g., through an announcement message 450). The system controller 230 may respond to an announcement message 450 received from the cloned instance 210d of Tool A sent on control channel 405, in a manner consistent with announcement messages received from other tools (e.g., 210a-c) of the appliance. The system controller 230 can identify the capabilities of the new tool 210d (and may even confirm that the new tool answers the system controller's previous request for the new tool) and approve the new tool by assigning one or more channels to the new tool through a channel assignment message 455 delivered via the control channel. In some cases, the system controller 230 may assign one or more of the channels previously assigned to a particular tool (e.g.,

210a) to its clone (e.g., 210d). In other cases, the system controller 230 may assign the cloned instance 210d of another tool 210a to channels distinct from the channels assigned to the other tool 210a. For instance, as illustrated in the example of FIG. 4G, additional channels 460, 465 may be defined and assigned to Tool A' 210d, with channels 460, 465 serving analogous roles as channels 425, 430 (respectively) in Tool A. Providing separate channels for a cloned instance of another tool may permit full load balancing between the two instances, such that a load balancer (e.g., implemented on the system controller 230, a classification tool, or other tool of the appliance 305) may designate that data is to be routed to one or the other instances of the tool 210a, 210d to balance the handling of transactions involving the functionality provided by each of the tools 210a, 210d.

Changes to the appliance 305 may be facilitated in a manner similar to the examples of FIGS. 4F-4G. A user or the system controller 230 may communicate with an appliance manager managing the deployment of a given appliance 305 and cause tools to be added, deleted, updated, replaced, or otherwise changed to modify the mix of tools used to implement the appliance. New or updated tools may announce their presence to the system controller 230 of the appliance 305 using the control channel and the system controller 230 can determine channel assignments to define the data flows that may involve the new tools. In situations where tools are deleted, the system controller 230 may de-assign the corresponding channels, and where the removal of a tool interrupts previously present data flows, the system controller 230, in some instances, may re-assign channels to other tools to allow data to potentially continue to flow downstream to other tools, which were previously connected to a deleted tool, among other examples.

Figure 5A:
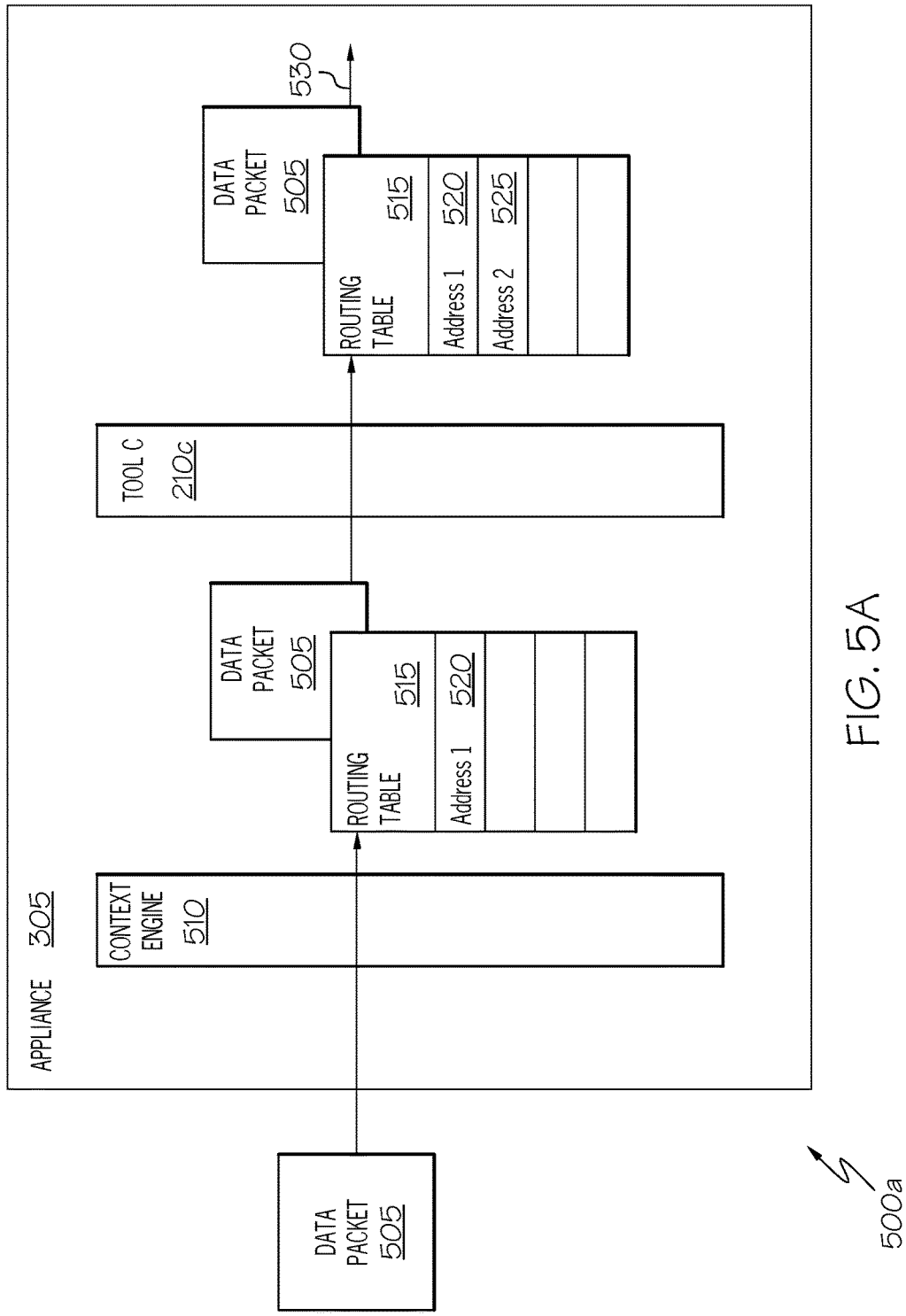
FIGS. 5A-5B illustrate simplified block diagrams representing an example processing of data utilizing composite tools of an example container-based software appliance.
Figure 5B:
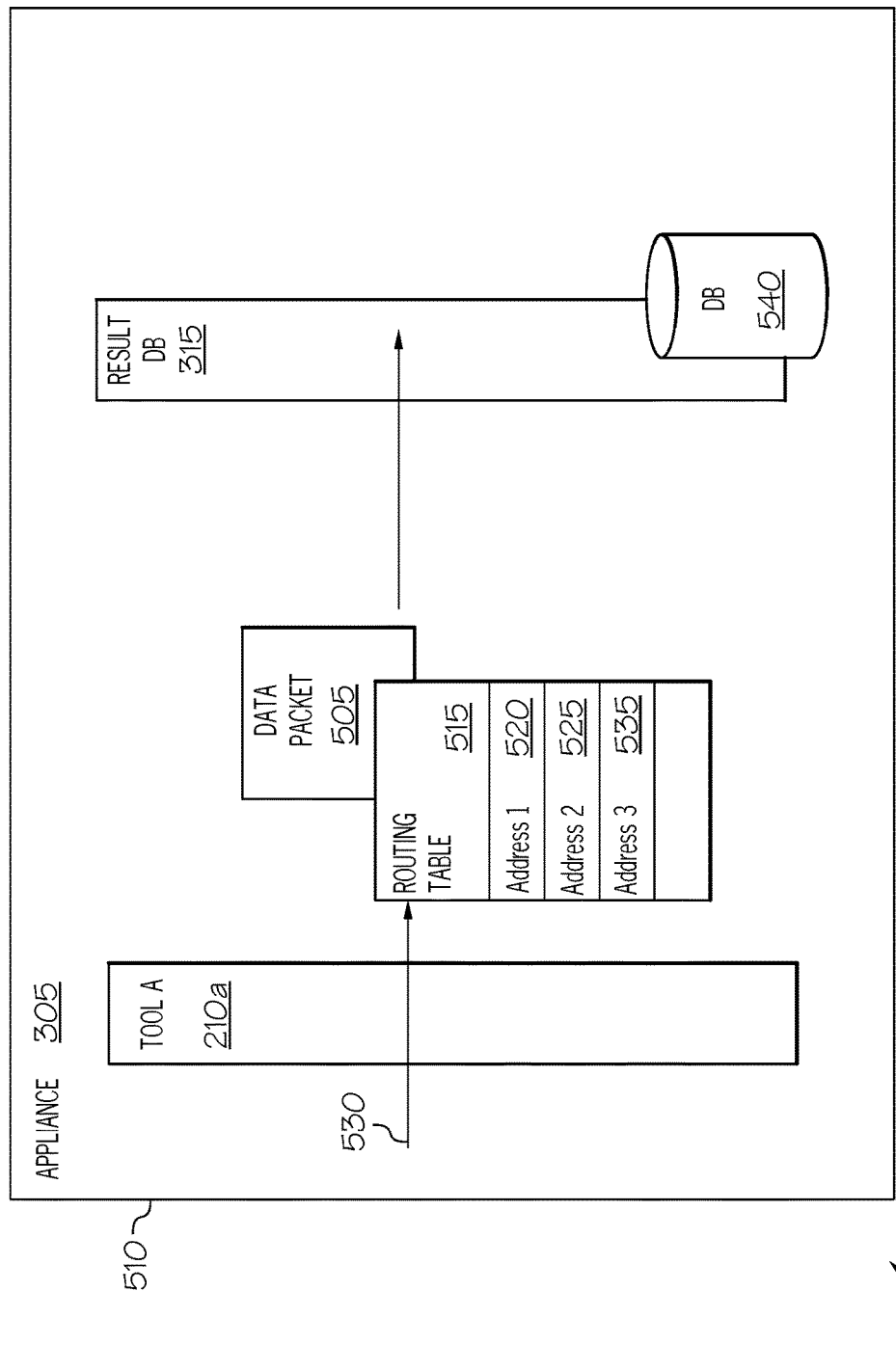

Turning to the examples illustrated by the simplified block diagrams 500a-b of FIGS. 5A-5B, some implementations of a customizable appliance platform may provide for decentralized routing of data to enable the traversal and processing of the data by multiple different tools within the appliance. The examples of FIGS. 5A-5B illustrate the example processing and traversal of a particular data packet through an appliance 305 as it is processed by one or more different containerized tools (e.g., 210a, 210c, etc.) in the appliance 305. For instance, as shown in FIG. 5A, a data packet 505 may be directed to and received by an appliance 305. The data packet may be generated in connection with the monitoring or administration of another computing system, such as a mainframe computing system. A context or classification engine 510 may be provided and designated to be the tool or logic that is to initially inspect the arriving packet 505 and determine (e.g., from a graph structure) context of the packet. For instance, packets may be received that contain a variety of different types of data, such as data identifying various types of parameters of the subject system (e.g., collected by a system monitor), data reflecting results and transactions of the subject system, data reported that relates to different components of a subject system (e.g., different LPARs in a mainframe system, different devices within an IoT system, etc.), among other data generated for different purposes, in different contexts, and including different content. Determining which tools (and which functionality) to apply to an arriving packet (e.g., 505) may depend on the content of the data packet 505 and the context of its content (e.g., the respective system subcomponent, transaction, or time window to which the packet content relates). As channel assignments within the appliance 305 may drive data flows between tools within the appliance, the initial routing of the data packet for processing by a particular one of the tools may affect and in some cases be dispositive of the data flow, or branch of potential data flows, the data packet with follow. Accordingly, an initial routing decision may be made by the context engine 510, to cause the data packet to be sent on an input channel corresponding to the tool that is to first process the packet following the context engine. Accordingly, in some implementations, a context engine 510 may be connected to the input channels of each one of potentially multiple different tools which may begin a data flow within the appliance.

In some implementations, a context engine 510 may itself be a distinct tool within the appliance 305 (e.g., separate from other tools including the system controller), implemented on a corresponding software container. In other instances, the context engine logic 510 may be incorporated in the system controller or another tool (such as a tool corresponding to an interface or packet intake for the appliance 305). In one example, the context engine 510 may utilize a graph structure to classify an incoming packet 505 based on its similarity to various classes or contexts of packets that may be handled by the appliance. Indeed, in some implementations, the context engine 510 may be implemented as a graph database tool implemented in a particular container of the appliance. In some instances, an instance of a context engine 510 may be considered a standard component, along with the system controller, appliance bus, and control channel, of an example appliance platform. While instances of a context engine 510 may be present in each instance of an appliance built upon the appliance platform, it should be appreciated that the data structures, algorithms, models, graphs, etc. utilized by a specific context engine (e.g., 510) may be calibrated to be specific to its corresponding appliance (e.g., and the types of data that this appliance is designed to analyze). In still other examples, logic of a context engine 510, rather than being resident on a single tool within the appliance, may be split between multiple tools or components of an example appliance (e.g., with classification logic performed by a first tool and initial routing determination, packet preparation, and other functions performed by one or more other tools), among other examples.

In some implementations, in addition to determining a classification, context, or categorization of arriving data packets and making initial routing determinations based on these categorizations, a context engine 510 may prepare the incoming packets (or other data) for further routing and processing by potentially multiple different tools within the appliance. In one example, routing decision may be made no more than one hop (between tools) at a time. In one example, a routing table 515 may be appended to the data packet 505 (or processed version of the original data packet received at the appliance) to assist in routing and tracking of the packet within the appliance. For example, in FIG. 5A, the context engine appends routing table 515 to the data packet 505 and populates a record 520 within the routing table with an address ("Address 1") identifying a particular one of the tools to which the data packet is to be forwarded in accordance with an initial routing determination made by the context engine 510 for the packet 505. The context engine 510 may then cause the packet (with the appended routing table) to be forwarded to this tool (e.g., Tool C 210c, as in the example of FIG. 4D) on a channel assigned to the Tool C for the reception of inbound packets.

Continuing with the example of FIGS. 5A-5B, a first tool (e.g., 210c) in a data flow may receive a packet 505 with appended routing table and strip the routing table from the packet in order to process the packet in accordance with one or more algorithms. In some cases, the next routing destination for the packet may be conditioned on the results of the processing by a current tool (e.g., 210c). As an example, a data analytics tool may determine an anomaly in data it is asked to process. If there is an anomaly, the data analytics tool may pass the data to a tool equipped with functionality for analyzing or responding to anomalous conditions. If, however, no anomaly is detected, the packet may be routed to another tool (e.g., not concerned with processing data in which anomalies have been detected). In the example of FIG. 5A, in response to processing the data packet, Tool C 210c may determine that the packet should be further processed by another tool, Tool A 210a. Accordingly, Tool C can add or populate a next record 525 in the routing table 510 to indicate the destination of the next tool 210a and corresponding hop in the data flow. Further, Tool C can send (at 530) the packet (e.g., with the updated routing table 510 attached) on an outbound channel assigned to Tool C that connects Tool C to Tool A. In some cases, the routing table may further (or alternatively) indicate an identifier of the specific channel on which the data packet 505 is sent.

Continuing the example of FIG. 5A through the simplified block diagram 500b of FIG. 5B, the packet sent (at 530) by Tool C to Tool A with an appended routing table 510 may arrive at Tool A. As in the case of Tool C, Tool A may process the received packet to generate one or more results and, in some cases, a determination of which of potentially multiple next hops to send the data packet. In some implementations, a receiving tool (e.g., 210a) may process a received packet independent of the attached routing table. In other cases, a tool may inspect the path followed by the incoming data (or transaction represented by the data) by reading records included in the appended routing table 510, and adjust or otherwise base processing of the data on the path followed by the data (e.g., based on evidence that one or more previous tools and analytic processes have already been performed or completed based on the routing table entries (e.g., 520, 525)), among other examples.

Upon completing its processing of the received packet 505, Tool A 210a may determine a next destination within the appliance's network of tools and update the routing table 515 with an additional entry 535 to indicate the next routing hop within the current transaction or data flow. The tool 210a may then send the packet 505 on a corresponding one of its assigned outbound channels such that the packet 505 continues on its path. Eventually, substantive processing of the packet 505 may conclude and an end result or other record or output of the transaction (involving the processing of the packet by potentially multiple different tools) may be generated. In the example of FIG. 5B, a result corresponding to the processing of the packet 505 may be recorded in a record generated and stored in connection with a data repository tool 315 (e.g., a result database (DB) tool maintaining database 540). In some implementations, the routing table 515 developed during the routing of the transaction from tool to tool within the appliance may also be stored (e.g., in DB 540 or a separate database) in association with the result stored by the repository tool 315. A routing or transaction history may thereby be developed during the processing and stored, for instance, for future processing by other tools or systems. For instance, such routing tables (and the included information) may be utilized, for instance, to optimize the analytic path within the appliance, provide an audit trail to identify the analysis, performance of the various tools during the analysis, etc., and/or for use in a stateful analysis (e.g., where the processing by one tool is affected by or based on prior processing by another one of the tools (as would be identified in the received routing table)), among other example uses. In some instances, results generated from a transaction may additionally, or alternatively, be output by the appliance 305 (e.g., by a specific tool in the appliance) for consumption in a graphical user interface, by another system, for storage in an external data repository, among other examples.

While the example of FIGS. 5A-5B referred to a "packet" being processed and passed between multiple different tools, it should be appreciated that the packet initially received by a first tool (e.g., 210c) in a data flow, in some instances, may be transformed during processing by one or more of the tools in the data flow, such that downstream tools (e.g., 210a) process results of upstream tools (e.g., 210c) rather than the original data. These may include modified versions of the original data or entirely new data reflecting results of upstream processing. In other instances, the same packet may indeed be processed and handed off by multiple different tools during the data flow, or versions of the same packet (e.g., altered in one or more of the processing step), may be passed along the data flow, among other examples. Indeed, the form of the results and mechanisms for processing the data (e.g., 505) at each tool (e.g., 210a,c) may be design-specific. Indeed, the ability of one (downstream) tool to accept result data from another (upstream) tool may be based on the ability of the downstream tool to process data in a format returned by the upstream tool (with such considerations being taken into account (e.g., by the system controller) during assignment of channels and inter-tool connections within the appliance 305. Further, given the possibility of data transformation during the processing by tools in the appliance, a routing table 515 (or other data structure) associated with and following the transaction as it progresses through the appliance may be supplemented to indicate the intermediate results generated at each tool and/or the initial data as it was received prior to processing by tools in the appliance, among other examples.

FIGS. 6A-6B are flowcharts 600a-b showing example techniques involving an example appliance to be composed of multiple interconnected container-based tools, including appliances adopting one or more of the features and principles discussed in the foregoing. In the example of FIG. 6A, an announcement message is received 605 (e.g., by a system controller tool on the appliance) from a particular new container-based software tool on a software-based control channel on the appliance. In some cases, the announcement message may include a first message announcing the new software tool's arrival, followed by a second message indicating one or more attributes of the new tool, each sent on the control channel by the new software tool. From the announcement message(s), capabilities of the new software tool may be determined 610, including transactions capable of being supported by the new software tool by virtue of these capabilities and/or a set of other software tools with which the new software tool may potentially interact with to proceed or succeed the other software tool(s) in a data flow or transaction involving the appliance. Based on the determined capabilities, the system controller may assign 615 (virtual) channels of the appliance's software bus to the new software tool. Some of the assigned channels may be assigned as inbound (or receiving or listening) channels of the new software tool, while other assigned channels may be assigned as outbound channels (i.e., on which data is to be sent by the new software tool to other tools or an outbound interface of the appliance). Having created this assignment, the system controller may send 620 a channel assignment message to the new software tool over the control channel to indicate the assignment(s) of these assigned channels to the new software tool. The appliance may then be launched 625 (or resumed, in cases where the new software tool is added to form a modified version of an existing appliance) such that the new software tool is interconnected to other tools in the appliance by the assigned channels. Data may be processed by the new software tool as it received on the assigned inbound channels, and results from the processing may be communicated to other tools in the appliance using the assigned outbound channels, among other example activities.

Turning to the example of FIG. 6B (e.g., following the launch 625 of an appliance including a collection of container-based tools organized using an example container-based system controller tool), a packet (o other form of data) may be received 635 at an appliance from a source (e.g., associated with a subject computing system). A context (or classification or categorization) for the packet may be determined 635 and a routing table may be appended 640 to the packet prior to the packet being forwarded to other tools within the appliance. An initial routing hop may be determined 645 for the packet corresponding to the packet being directed to one of these other tools for processing. The determination of this initial routing hop may be based on the context determined (at 635) for the packet. A record of the routing table may be populated 650 (e.g., by the same appliance component which either (or both) appended 640 the routing table to the packet or determined 635 the context of the packet) with information to identify a particular channel within the appliance's (software-based) system bus and/or the first tool to which the packet is to be forwarded for processing. The packet may then be sent 655 to the first tool, with the appended routing table. Each tool that processes the packet (or processes data associated with or generated from this packet in a transaction) may likewise determine a next routing hop for the packet and populate a record of the routing table to be re-appended to the data at each hop along the corresponding transaction. In some instances, upon conclusion of a transaction associated with the packet, the accompanying routing table may be populated with multiple records to identify each hop between tools of the appliance used to handle the transaction. This routing table may be stored and associated with other transaction result data generated during the transaction.

It should be appreciated that the flowcharts and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or alternative orders, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as suited to the particular use contemplated.

The invention claimed is:

1. A method comprising:
   receiving, at a first software container in a software system, an announcement message on a control channel from a first tool hosted on a second software container in the software system, wherein the first software container hosts a system controller and the first tool comprises a data analytics tool;
   identifying, at the system controller, capabilities of the first tool;
   assigning, based on the identified capabilities, a first channel and a second channel to the first tool, wherein the first and second channels comprise software-based communication channels in the software system, the first channel is assigned to the first tool for use in sending messages to other tools in the software system, and the second channel is assigned to the first tool for use in receiving messages from other tools in the software system; and
   sending a channel assignment message to the first tool on the control channel, wherein the channel assignment message indicates assignment of the first and second channels to the first tool.

2. The method of claim 1, further comprising:
   determining a first transaction type to involve the first tool and a second tool hosted on a third software container in the software system;
   assigning the first channel to the second tool based on the first transaction type, wherein the second tool is to receive a message in transactions of the first transaction type on the first channel.

3. The method of claim 2, further comprising:
   receiving, at the system controller, an announcement message from the second tool on the control channel;
   determining capabilities of the second tool; and
   assigning the first channel and a third channel to the second tool based on the capabilities, wherein the second tool is to send messages to a subset of tools in the software system using the third channel.

4. The method of claim 1, further comprising:
receiving a data packet for processing by the software system; and
routing the data packet to the first tool using the first channel.

5. The method of claim 4, further comprising:
identifying a context of the data packet; and
determining routing of the data packet to the first tool based on the context.

6. The method of claim 4, wherein the data packet comprises data collected from monitoring of a mainframe computing system.

7. The method of claim 6, wherein the software system is to process the data packet to determine performance attributes of the mainframe computing system.

8. The method of claim 1, further comprising launching an appliance comprising a plurality of tools comprising the first tool, wherein the appliance is to process data packets and each data packet processed by the appliance is to be processed using at least a subset of the plurality of tools.

9. The method of claim 8, further comprising:
receiving a heartbeat signal from the first tool following launch of the appliance; and
determining status of the first tool based on the heartbeat signal.

10. The method of claim 9, further comprising:
generating another instance of the first tool based on the status; and
assigning another channel to the other instance of the first tool.

11. The method of claim 3, wherein the second tool comprises an alert manager.

12. The method of claim 1, wherein the data analytics tool utilizes a machine learning algorithm.

13. The method of claim 1, further comprising receiving, following the announcement message, a capability advertisement message from the first tool, wherein the capabilities of the first tool are identified from the capability advertisement message.

14. A non-transitory computer readable medium having program instructions stored therein, wherein the program instructions are executable by a computer system to perform operations comprising:
receiving, at a first software container in a software system, an announcement message on a control channel from a first tool hosted on a second software container in the software system, wherein the first software container hosts a system controller and the first tool comprises a data analytics tool;
determining a type of transaction to involve the first tool in the software system;
assigning, based on the identified type of transaction, a first channel and a second channel to the first tool, wherein the first and second channels comprise software-based communication channels in the software system, the first channel is assigned to the first tool for use in sending messages to other tools in the software system in association with at least the type of transaction, and the second channel is assigned to the first tool for use in receiving messages from other tools in the software system in association with at least the type of transaction; and
sending a channel assignment message to the first tool on the control channel, wherein the channel assignment message of the first and second channels to the first tool.

15. A system comprising:
a processor apparatus;
computer memory;
a plurality of software containers, wherein each of the software containers is to host a respective software tool, and at least a portion of the tools hosted on the plurality of software containers comprise data analytics tools;
a system controller, hosted in a particular software container, wherein the system controller is to:
establish a plurality of software-based communication channels;
communicate with each of the tools in the plurality of software containers using a control channel;
determine capabilities of each of the tools; and
assign respective channels in the plurality of software-based communication channels to each of the tools based on the capabilities identified for the respective tool.

16. The system of claim 15, wherein one of the tools hosted on the plurality of software containers comprises a graph database.

17. The system of claim 15, further comprising a mainframe computing system, wherein the mainframe computing system comprises a system monitor to collect data describing functional attributes of the mainframe computing system, and the data is to be provided to the tools hosted on the plurality of software containers for analysis.

18. The system of claim 17, wherein the one of the tools hosted on the plurality of software containers comprises an alert manager to detect alert conditions from results of the data analytics tools.

19. The system of claim 15, further comprising a plurality of host systems to host the plurality of software containers.

* * * * *